United States Patent
Kalle et al.

(10) Patent No.: US 12,368,758 B2
(45) Date of Patent: Jul. 22, 2025

(54) CONTEXT-BASED CRYPTOGRAPHY SELECTION

(71) Applicants: RAKUTEN MOBILE, INC., Tokyo (JP); Rakuten Symphony, Inc., Tokyo (JP)

(72) Inventors: Ritesh Kumar Kalle, Tokyo (JP); Prabhu Kaliswamy, Indore (IN); Raghavendran Ramiya, Indore (IN)

(73) Assignees: RAKUTEN MOBILE, INC., Tokyo (JP); RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/010,244

(22) PCT Filed: Sep. 22, 2022

(86) PCT No.: PCT/US2022/044317
§ 371 (c)(1),
(2) Date: Dec. 14, 2022

(87) PCT Pub. No.: WO2024/015087
PCT Pub. Date: Jan. 18, 2024

(65) Prior Publication Data
US 2024/0244091 A1 Jul. 18, 2024

(30) Foreign Application Priority Data
Jul. 13, 2022 (IN) .............................. 202241040077

(51) Int. Cl.
*H04L 9/40* (2022.01)
(52) U.S. Cl.
CPC .............. *H04L 63/205* (2013.01); *H04L 9/40* (2022.05)

(58) Field of Classification Search
CPC . H04L 63/205; H04L 9/40; H04L 9/16; H04L 9/852; H04L 63/428
(Continued)

(56) References Cited

U.S. PATENT DOCUMENTS 7,930,735 B2 * 4/2011 Vigelette ................. H04L 63/18
713/168
9,923,923 B1 * 3/2018 Sharifi Mehr ...... H04L 63/0428
(Continued)

OTHER PUBLICATIONS

International Search Report dated Feb. 17, 2023, issued in International Application No. PCT/US2022/044317.
(Continued)

*Primary Examiner* — Liang Che A Wang
(74) *Attorney, Agent, or Firm* — Sughrue Mion, PLLC (57) ABSTRACT

A system and method of selecting a cryptography algorithm within a network. The method can include receiving network data from a one or more network interfaces or network elements; analyzing the network data to identify a cryptography algorithm from a plurality of cryptography algorithms; and identifying the cryptography algorithm from the plurality of cryptography algorithms based on at least one of the following parameters: network security level, network criticality, or energy efficiency. In addition, the step of analyzing the network data to identify the cryptography algorithm may further include receiving a plurality of identifiers associated with the network data, wherein the plurality of identifiers are each further associated with a degree of importance in connection with the network security level parameter.

20 Claims, 4 Drawing Sheets (58) Field of Classification Search
USPC .................................... 726/1; 709/223, 229
See application file for complete search history.

(56) References Cited

U.S. PATENT DOCUMENTS

| | | |
|---|---|---|
| 11,218,300 B1 * | 1/2022 | Shea ..................... H04L 9/0897 |
| 11,240,014 B1 | 2/2022 | Maganti et al. |
| 2010/0278338 A1 * | 11/2010 | Chang ....................... H04L 9/16 |
| | | 726/1 |
| 2013/0311778 A1 * | 11/2013 | Cherukuri ........... H04L 67/1001 |
| | | 713/171 |
| 2022/0209944 A1 * | 6/2022 | Nix ....................... H04L 9/0861 |

OTHER PUBLICATIONS

Written Opinion dated Feb. 17, 2023, issued in International Application No. PCT/US2022/044317.

* cited by examiner

CONTEXT-BASED CRYPTOGRAPHY SELECTION

CROSS-REFERENCE TO RELATED APPLICATION(S)

This application is a National Stage of International Application No. PCT/US2022/044317, filed on Sep. 22, 2022, and claiming priority to Indian Patent Application number 202241040077, filed on Jul. 13, 2022, the disclosures of which are incorporated herein by reference in their entireties.

TECHNICAL FIELD

The present disclosure described herein relates to context-based cryptography selection for energy efficient operations.

BACKGROUND

Various standard bodies have focused on Post Quantum Cryptography (PQC) algorithms which can be resistant to a cryptanalytic attack by a quantum computer due to availability of quantum computational resources. Various PQC algorithms have been under review by the standard bodies, such as for example the National Institute of Standards and Technology (NIST) which is considering a PQC algorithm such as disclosed in NIST IR 8413, "Status Report on the Third Round of the NIST Post-Quantum Cryptography Standardization Process, published July 2022. In addition, Banerjee et al. in "Energy Consumption of Candidate Algorithms for NIST PQC Standards," University of Waterloo, pp. 1-13, discusses energy consumption analysis of various cryptography algorithms. Further, there are also a number of proprietary as well as open source implementations of the PQC algorithms available for researchers to study performance properties and cryptographic strength.

Hence, owing to the requirement that the PQC algorithms are quantum resistant, the complexity of cryptographic operations involved in PQC algorithms are in need of enhancements, such as with respect to new mathematical principles, increased key sizes, and algorithmic complexities, etc. A common methodology that is proposed by NIST to classify the PQC algorithms in terms of the offered security levels is as follows:

- Level I: Which can be at least as hard as breaking security of block cipher using exhaustive key search with 128-bit key, for example, but not limited to Advanced Encryption Standard (AES) 128.
- Level II: Which can be at least as hard as breaking the security of hash function using collision search with 256-bit hashed message digest, for example, but not limited to Secure Hash Algorithm (SHA) 256/SHA3-256.
- Level III: Which can be at least as hard as breaking the security of the block cipher using exhaustive key search with 192-bit key, for example, but not limited to AES 192.
- Level IV: Which can be at least as hard as breaking the security of the hash function using collision search with 384-bit hashed message digest, for example, but not limited to SHA384/SHA3-384.
- Level V: Which can be at least as hard as breaking the security of the block cipher using an exhaustive key search with 256-bit key, for example, but not limited to AES 256.

However, enhanced cryptographic operations can result in higher performance requirements from a computing device's Central Processing Unit (CPU) and memory resources, among other components, and therefore result in higher energy consumption by network elements. Wireless telecommunication networks, such as those deployed beyond 5th generation (5G) or 6th generation (6G) Open Radio Access Network (O-RAN) elements, are expected to support Zero Trust network design and operations. Every network element interface may be required to provide methods to secure Confidentiality, Integrity, and Authenticity of operations which needs to be achieved by implementation of PQC cryptographic methods and protocols. Though standards specify a variety of the PQC algorithms and associated parametric variations, the standards would retain different levels of energy consumption signatures. As a result, mobile network operators face a very complex problem to adopt an appropriate encryption algorithm for each network use case resulting in non-optimal or sub-optimal choice of the PQC algorithms and the parameters, thereby resulting in wasteful consumption of resources and energy. Thus, it is desired to address the aforementioned disadvantages or other shortcomings and provide a useful alternative.

Hence, what is needed is a method and system for a context-based cryptography selection that requires minimum energy consumption, resource efficient, and is less taxing on computing resources and network elements.

SUMMARY

According to example embodiments, context-based cryptography selection method and system for energy efficient operations in wireless communication networks is disclosed. The method and system can provide an optimal and automated process to determine an appropriate PQC cryptography algorithm based on various parameters, including but not limited to the context of network usage, level of cryptographic protection, and energy consumption, among others. The method and system of the disclosure described herein enables a reduction in energy consumption, optimization of encryption levels based on the context of network utilization, and associated performance improvements (latency reduction, etc.) due to automation in the decision making process, among other advantages.

According to other example embodiments, a method and system for context-based cryptography selection for energy efficient operations is disclosed, wherein method and system can include initializing system parameters and collecting O-Cloud telemetry information via O1 and O2 interfaces and receiving external system context via application interface or operator inputs, which can include network criticality level and an applicable security level. The method and system of the disclosure described herein can also include determining optimal energy efficient crypto configuration via a look up table, supervised learning, or a decision tree approach and selecting via O-Cloud the final cryptography parameters from the cryptography family guidance received from rApp and a Service Management and Orchestrator (SMO). Here, rApp can refer to the applications hosted on the Non Real Time RAN Intelligent Controller (Non RT-RIC). The method and system of the disclosure described herein can also include providing a final policy guidance by the rApp security application to the O-Cloud layer and applying the policy to the O-Cloud layer. Further, the realization of the cryptography optimization can be more generically supported through a Cloud Orchestration Layer.

According to other exemplary embodiments, a method of selecting a cryptography algorithm within a network is disclosed. The method can include receiving network data from one or more network interfaces or network elements; analyzing the network data to identify a cryptography algorithm from a plurality of cryptography algorithms; and identifying the cryptography algorithm from the plurality of cryptography algorithms based on at least one of the following parameters: network security level, network criticality, or energy efficiency.

In addition, the step of analyzing the network data to identify the cryptography algorithm may further include receiving a plurality of identifiers associated with the network data, wherein the plurality of identifiers are each further associated with a degree of importance in connection with the network security level parameter.

Further, the step of analyzing the network data to identify the cryptography algorithm may further include receiving a plurality of identifiers associated with the network data, wherein the plurality of identifiers are each further associated with a degree of importance in connection with the network criticality parameter.

Also, the step of analyzing the network data to identify the cryptography algorithm may further include receiving a plurality of identifiers associated with the network data, wherein the plurality of identifiers are each further associated with a degree of importance in connection with the energy efficiency parameter.

In addition, the step of receiving network data from one or more network interfaces or network elements within a network is further based on a service management and orchestrator (SMO) framework, wherein the SMO framework comprises an orchestrator module in communication with a network infrastructure module.

Further, the step of analyzing the network data to identify a cryptography algorithm from a plurality of cryptography algorithms may be performed via the orchestrator module.

Moreover, the method may include transmitting the identified cryptography algorithm from the orchestrator module to the network infrastructure module.

Also, the method may include receiving, via the orchestrator module, a selection of conditions with respect to the identified cryptography algorithm from the network infrastructure module.

In addition, the method may include generating, via the orchestrator module, a cryptography policy for the network with respect to the identified cryptography algorithm.

Moreover, the method may include transmitting, via the orchestrator module, the cryptography policy for the network with respect to the identified cryptography algorithm to the network infrastructure module.

In other exemplary embodiments, an apparatus for selecting a cryptography algorithm within a network is disclosed. The apparatus can include a memory storage storing computer-executable instructions; and a processor communicatively coupled to the memory storage, wherein the processor is configured to execute the computer-executable instructions and cause the apparatus to: receive network data from a one or more network interfaces or network elements; analyze the network data to identify a cryptography algorithm from a plurality of cryptography algorithms; and identify the cryptography algorithm from the plurality of cryptography algorithms based on at least one of the following parameters: network security level, network criticality, or energy efficiency.

In addition, the computer-executable instructions, when executed by the processor, may further cause the apparatus to receive a plurality of identifiers associated with the network data, wherein the plurality of identifiers are each further associated with a degree of importance in connection with the network security level parameter.

Further, the computer-executable instructions, when executed by the processor, may further cause the apparatus to: receive a plurality of identifiers associated with the network data, wherein the plurality of identifiers are each further associated with a degree of importance in connection with the network criticality parameter.

Also, the computer-executable instructions, when executed by the processor, may further cause the apparatus to receive a plurality of identifiers associated with the network data, wherein the plurality of identifiers are each further associated with a degree of importance in connection with the energy efficiency parameter.

In addition, the step of receiving network data from one or more network interfaces or network elements within a network may be further based on a service management and orchestrator (SMO) framework, wherein the SMO framework comprises an orchestrator module in communication with a network infrastructure module.

Moreover, the step of analyzing the network data to identify a cryptography algorithm from a plurality of cryptography algorithms may be performed via the orchestrator module.

Further, the computer-executable instructions, when executed by the processor, may further cause the apparatus to transmit the identified cryptography algorithm from the orchestrator module to the network infrastructure module.

Also, the computer-executable instructions, when executed by the processor, may further cause the apparatus to receive, via the orchestrator module, a selection of conditions with respect to the identified cryptography algorithm from the network infrastructure module.

Further, the computer-executable instructions, when executed by the processor, may further cause the apparatus to generate, via the orchestrator module, a cryptography policy for the network with respect to the identified cryptography algorithm.

In other exemplary embodiments, a non-transitory computer-readable medium including computer-executable instructions for selecting a cryptography algorithm within a network by an apparatus is disclosed, wherein the computer-executable instructions, when executed by at least one processor of the apparatus, cause the apparatus to receive network data from a one or more network interfaces or network elements; analyze the network data to identify a cryptography algorithm from a plurality of cryptography algorithms; and identify the cryptography algorithm from the plurality of cryptography algorithms based on at least one of the following parameters: network security level, network criticality, or energy efficiency.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustrations and descriptions, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

In one implementation of the disclosure described herein, a display page may include information residing in the computing device's memory, which may be transmitted from the computing device over a network to a database center and vice versa. The information may be stored in memory at each of the computing device, a data storage resided at the edge of the network, or on the servers at the database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., any "smart phone"), a personal computer, server computer, or laptop computer; personal digital assistants (PDAs); a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including short-range ultra-high frequency (UHF) device, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar to "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also include a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, components, features, options, and/or attributes of the disclosure described herein. For example, the portal can be a web page accessed with a web browser, mobile device application, or any application or software residing on a computing device.

Figure 1:
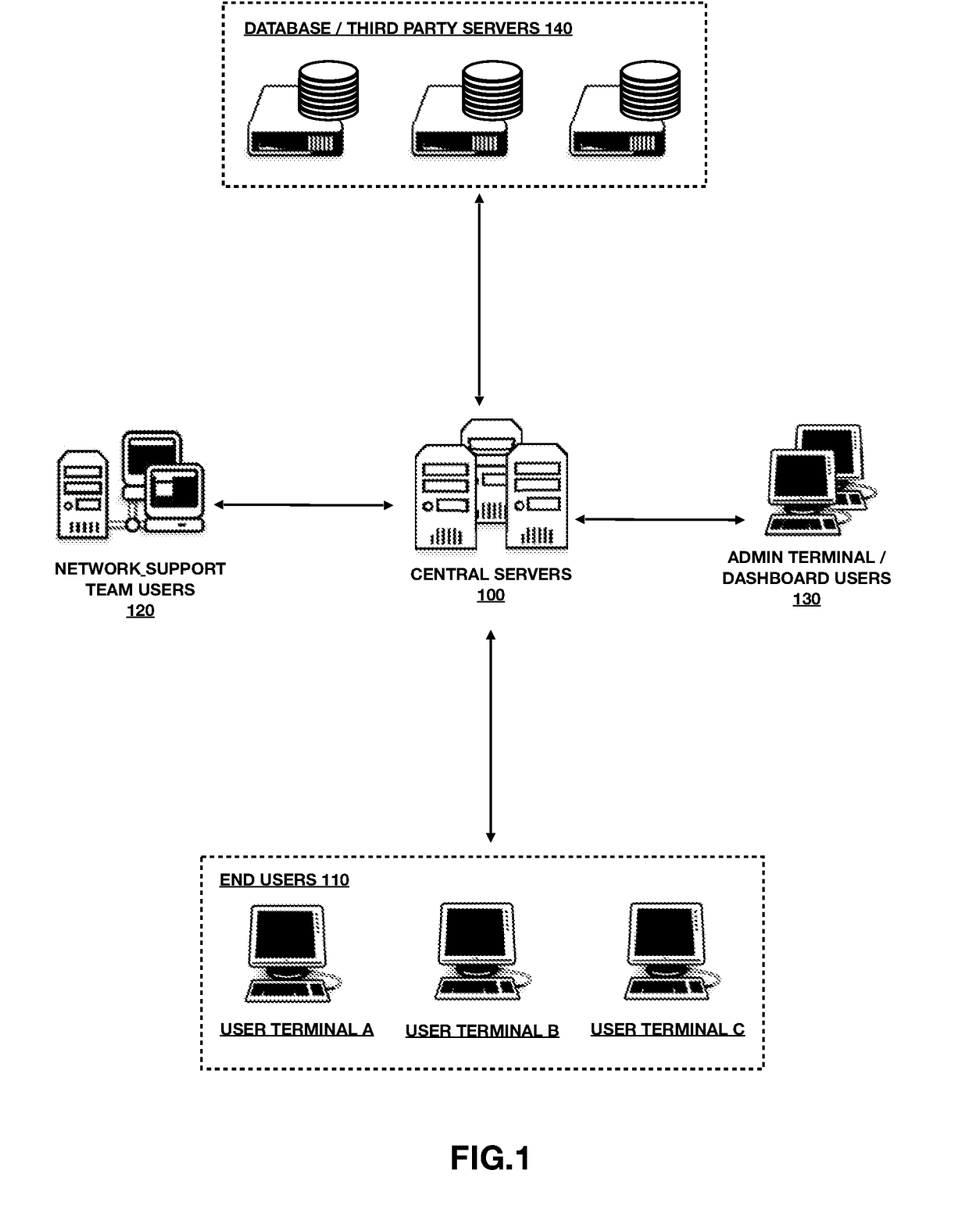
FIG. 1 illustrates a diagram of a general system architecture of the context-based cryptography selection method and system of the disclosure described herein according to one or more embodiments.

FIG. 1 illustrates a diagram of a general network architecture according to one or more embodiments. Referring to FIG. 1, end users 110, network support team users 120, and admin terminal/dashboard users 130 (collectively referred to herein as users 110, 120, and 130) can be in bi-directional communication over a secure network with central servers or application servers 100 according to one or more embodiments. In addition, users 110, 120, 130 may also be in direct bi-directional communication with each other via the network system of the disclosure described herein according to one or more embodiments. Here, users 110 can be any type of customer, network service provider agent, or vendor, among others, of a network or telecommunication service provider, such as users operating computing devices and user terminals A, B, and C. Each of users 110 can communicate with servers 100 via their respective terminals or portals, wherein servers 110 can provide or automatically operate the network impact prediction engine system and method of the disclosure described herein. Users 120 can include application development members or support agents of the network service provider for developing, integrating, and monitoring the context-based cryptography selection method and system of the disclosure described herein, including assisting, scheduling/modifying network events, and providing support services to end users 110. Admin terminal/dashboard users 130 may be any type of user with access privileges for accessing a dashboard or management portal of the disclosure described herein, wherein the dashboard portal can provide various user tools, GUI information, maps, graphs, and customer support options. It is contemplated within the scope of the present disclosure described herein that any of users 110 and 120 may also access the admin terminal/dashboard 130 of the disclosure described herein.

Still referring to FIG. 1, central servers 100 of the disclosure described herein according to one or more embodiments can be in further bi-directional communication with database/third party servers 140, which may also include users. Here, servers 140 can include vendors and databases where various captured, collected, or aggregated data, such as current, real-time, and past network related historical and KPI data, may be stored thereon and retrieved therefrom for network analysis, predictions, and simulations by servers 100. In addition, servers 140 can include various cryptography family suite or algorithms. However, it is contemplated within the scope of the present disclosure described herein that the context-based cryptography selection method and system of the disclosure described herein can include any type of general network architecture.

Still referring to FIG. 1, one or more of servers or terminals of elements 100-140 may include a personal computer (PC), a printed circuit board comprising a computing device, a minicomputer, a mainframe computer, a microcomputer, a telephonic computing device, a wired/wireless computing device (e.g., a smartphone, a personal digital assistant (PDA)), a laptop, a tablet, a smart device, a wearable device, or any other similar functioning device.

In some embodiments, as shown in FIG. 1, one or more servers, terminals, and users 100-140 may include a set of components, such as a processor, a memory, a storage component, an input component, an output component, a communication interface, and a JSON UI rendering component. The set of components of the device may be communicatively coupled via a bus.

The bus may comprise one or more components that permit communication among the set of components of one or more of servers or terminals of elements 100-140. For example, the bus may be a communication bus, a cross-over bar, a network, or the like. The bus may be implemented using single or multiple (two or more) connections between the set of components of one or more of servers or terminals of elements 100-140. The disclosure is not limited in this regard.

One or more of servers or terminals of elements 100-140 may comprise one or more processors. The one or more processors may be implemented in hardware, firmware, and/or a combination of hardware and software. For example, the one or more processors may comprise a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), a general purpose single-chip or multi-chip processor, or other programmable logic device, discrete gate or transistor logic, discrete hardware components, or any combination thereof designed to perform the functions described herein. A general purpose processor may be a microprocessor, or any conventional processor, controller, microcontroller, or state machine. The one or more processors also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function.

The one or more processors may control overall operation of one or more of servers or terminals of elements 100-140 and/or of the set of components of one or more of servers or terminals of elements 100-140 (e.g., memory, storage component, input component, output component, communication interface, rendering component).

One or more of servers or terminals of elements 100-140 may further comprise memory. In some embodiments, the memory may comprise a random access memory (RAM), a read only memory (ROM), an electrically erasable programmable ROM (EEPROM), a flash memory, a magnetic memory, an optical memory, and/or another type of dynamic or static storage device. The memory may store information and/or instructions for use (e.g., execution) by the processor.

A storage component of one or more of servers or terminals of elements 100-140 may store information and/or computer-readable instructions and/or code related to the operation and use of one or more of servers or terminals of elements 100-140. For example, the storage component may include a hard disk (e.g., a magnetic disk, an optical disk, a magneto-optic disk, and/or a solid state disk), a compact disc (CD), a digital versatile disc (DVD), a universal serial bus (USB) flash drive, a Personal Computer Memory Card International Association (PCMCIA) card, a floppy disk, a cartridge, a magnetic tape, and/or another type of non-transitory computer-readable medium, along with a corresponding drive.

One or more of servers or terminals of elements 100-140 may further comprise an input component. The input component may include one or more components that permit one or more of servers and terminals 100-140 to receive information, such as via user input (e.g., a touch screen, a keyboard, a keypad, a mouse, a stylus, a button, a switch, a microphone, a camera, and the like). Alternatively or additionally, the input component may include a sensor for sensing information (e.g., a global positioning system (GPS) component, an accelerometer, a gyroscope, an actuator, and the like).

An output component any one or more of servers or terminals of elements 100-140 may include one or more components that may provide output information from the device 100 (e.g., a display, a liquid crystal display (LCD), light-emitting diodes (LEDs), organic light emitting diodes (OLEDs), a haptic feedback device, a speaker, and the like).

One or more of servers or terminals of elements 100-140 may further comprise a communication interface. The communication interface may include a receiver component, a transmitter component, and/or a transceiver component. The communication interface may enable one or more of servers or terminals of elements 100-140 to establish connections and/or transfer communications with other devices (e.g., a server, another device). The communications may be enabled via a wired connection, a wireless connection, or a combination of wired and wireless connections. The communication interface may permit one or more of servers or terminals of elements 100-140 to receive information from another device and/or provide information to another device. In some embodiments, the communication interface may provide for communications with another device via a network, such as a local area network (LAN), a wide area network (WAN), a metropolitan area network (MAN), a private network, an ad hoc network, an intranet, the Internet, a fiber optic-based network, a cellular network (e.g., a fifth generation (5G) network, sixth generation (6G) network, a long-term evolution (LTE) network, a third generation (3G) network, a code division multiple access (CDMA) network, and the like), a public land mobile network (PLMN), a telephone network (e.g., the Public Switched Telephone Network (PSTN)), or the like, and/or a combination of these or other types of networks. Alternatively or additionally, the communication interface may provide for communications with another device via a device-to-device (D2D) communication link, such as FlashLinQ, WiMedia, Bluetooth, ZigBee, Wi-Fi, LTE, 5G, and the like. In other embodiments, the communication interface may include an Ethernet interface, an optical interface, a coaxial interface, an infrared interface, a radio frequency (RF) interface, or the like.

Figure 2:
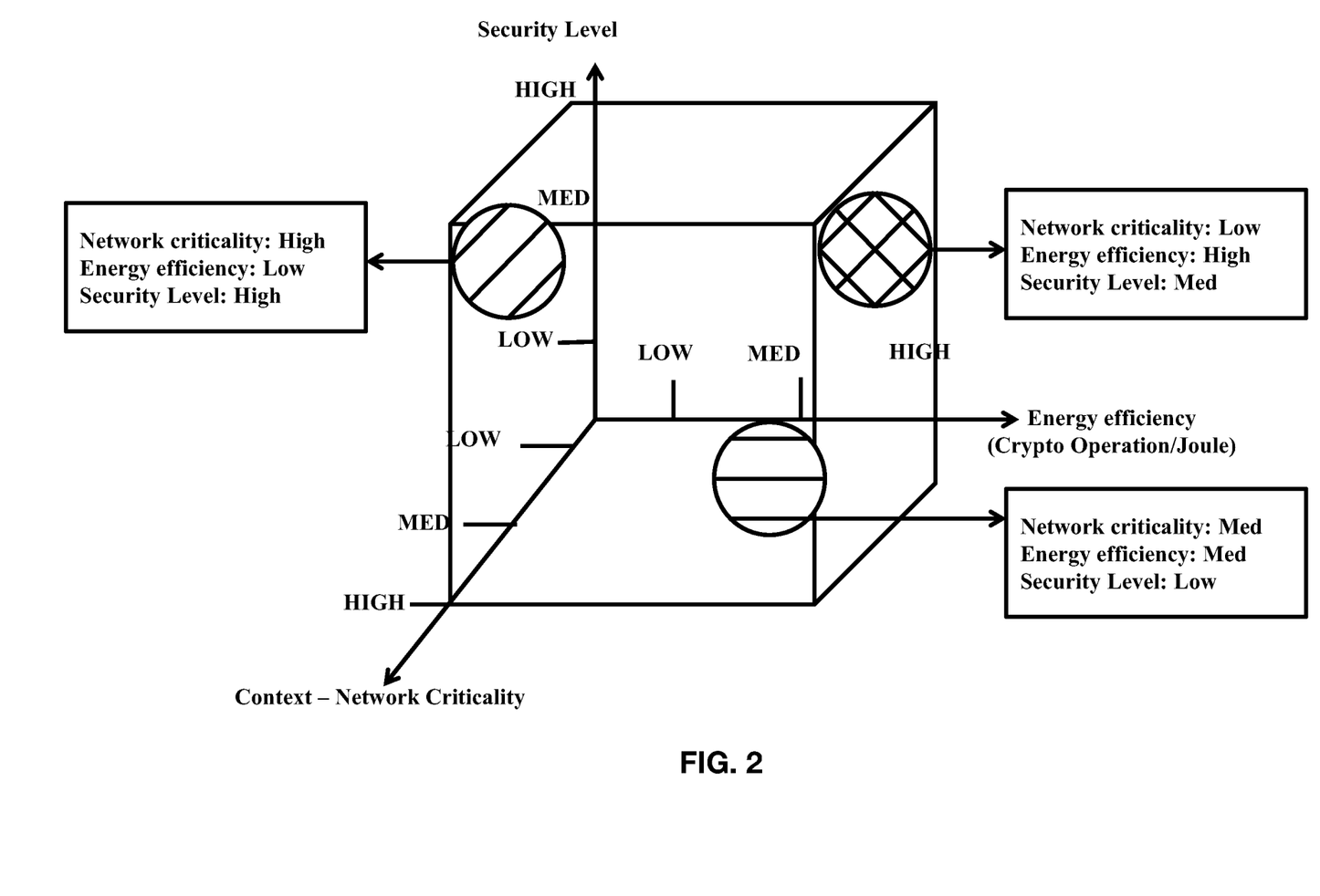
FIG. 2 illustrates a perspective view diagram of a three-dimensional space representing standardized levels for parameters considered for selection of a cryptographic algorithm for energy efficient operations in wireless communication networks, according to one or more embodiments.

FIG. 2 illustrates a three-dimensional space representing standardized levels for each parameter considered for selection of cryptographic algorithm for energy efficient operations in wireless communication networks, according to an embodiment as disclosed herein. Referring to the FIG. 2, the three-dimensional space optimization of the disclosure described herein is used to provide three standardized levels, namely, "Low", "Medium", and "High" for each parameter considered for the selection of the cryptographic algorithm for energy efficient operations in wireless communication networks. Each of the standardized levels are represented on their respective x, y, and z-axis in ascending order. Further, the context-based parameters considered within the context-based cryptography selection system and method of the disclosure described herein can include a cryptography algorithm (or cryptography family or suite) and a respective encryption level selection based on 1) network usage indicating network criticality ("Network Criticality), 2) energy consumption or energy efficiency ("Energy Efficiency") in Crypto Operation/Joule, and 3) level of cryptographic protection and security ("Security Level"). The foregoing parameters are represented on each axis of the three-dimensional space along with the three standardized levels.

Here, the method and system of the disclosure described herein includes a seamless selection of the cryptographic algorithm based on context-based parameters and standardized levels for energy efficient operations in wireless communication networks. The choice of an cryptography algorithm from a family of the cryptographic algorithms and corresponding variations can be achieved through statistical or machine learning (ML) based clustering methods. Further, the standardized levels can be extended to more granular levels for determining optimal combinations of the cryptographic algorithm and the parameters for energy efficient operations. Here, in some exemplary embodiments, the realization of the cryptography algorithm selection optimization is described based on O-RAN architecture implementation. However, it is contemplated within the scope of the present disclosure described herein that the disclosed method and system can also be more supported through a Cloud Orchestration Layer.

Figure 3:
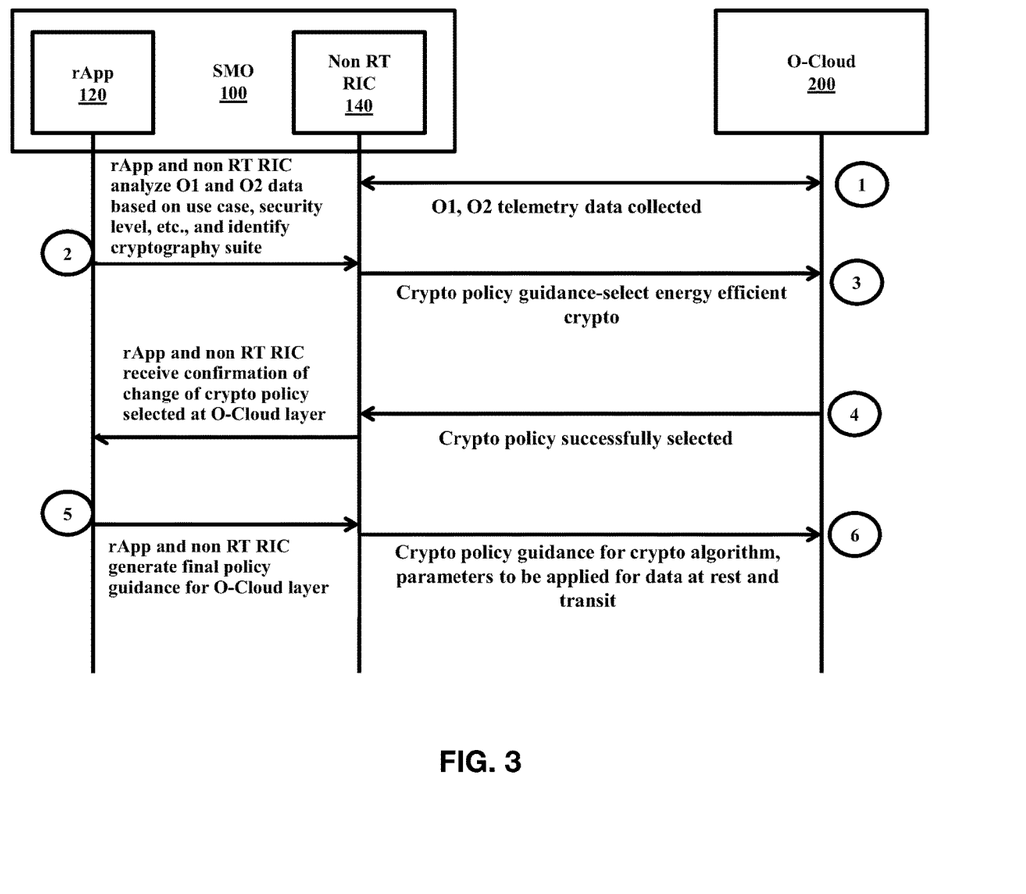
FIG. 3 illustrates another diagram for a method of enabling an O-RAN network compatible selection of a cryptographic algorithm for energy efficient operations with a Service Management and Orchestrator (SMO), according to one or more embodiments.
Figure 4:
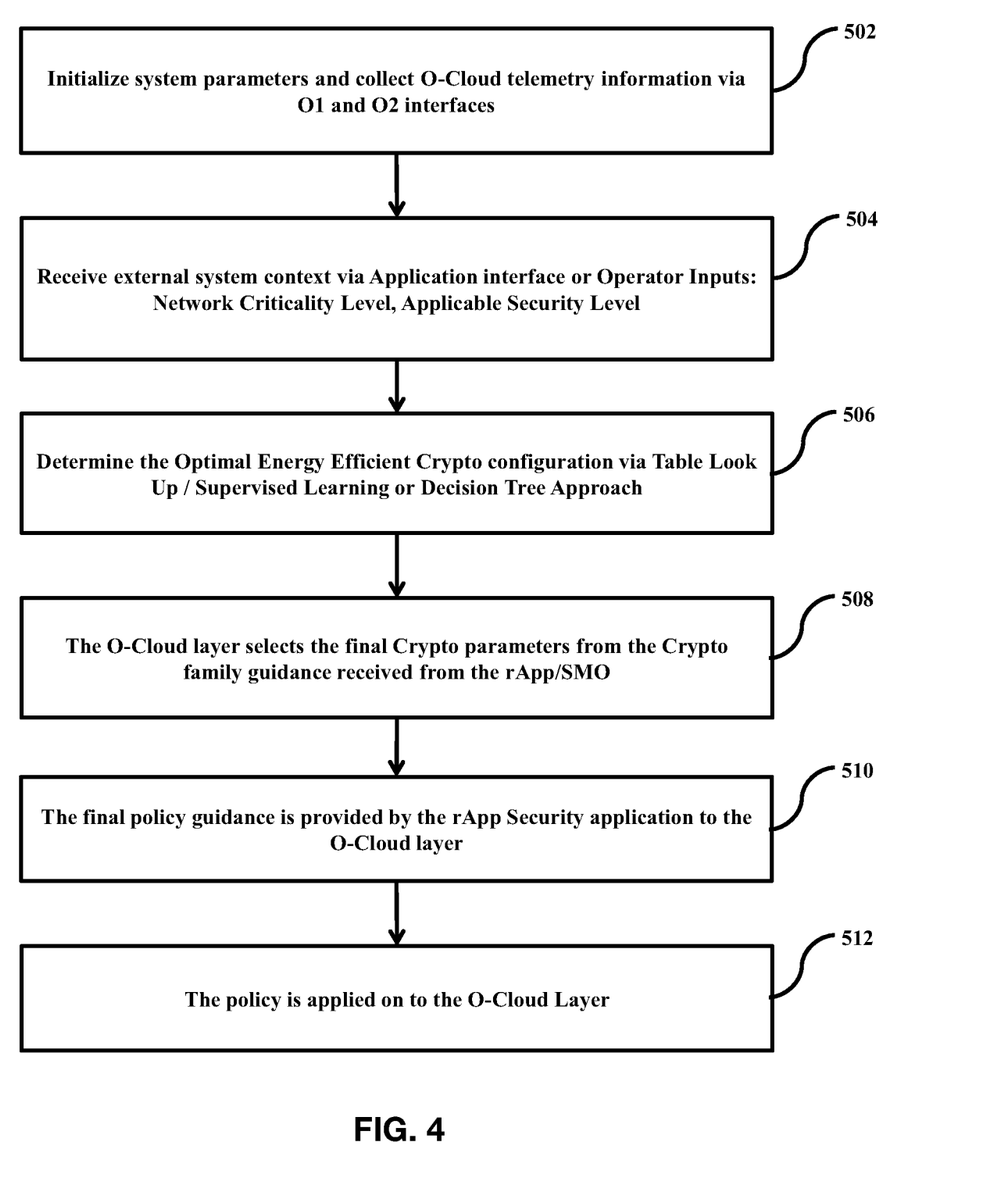
FIG. 4 illustrates a process flow diagram illustrating a method for determining a cryptography configuration for the context-based cryptography selection method and system of the disclosure described herein, according to one or more embodiments.

FIG. 3 is a process flow or signaling diagram illustrating a method for enabling an O-RAN network compatible selection of the cryptographic algorithm for energy efficient operations within a Service Management and Orchestrator (SMO) module or framework 100, according to one exemplary of the disclosure described herein. In particular, at step 1, O-Cloud platform module 200 sends O1 and O2 telemetry data collected to SMO module or framework 100, wherein SMO module or framework 100 includes rApp module 120 and Non Real-Time RAN Intelligent Controller platform module 140 ("Non RT RIC"). Here, rApp module 120 can be any type of RAN automation application or process, such as network evolution rApps, network deployment rApps, network optimization rApps, network healing rApps, and automation and Artificial Intelligence (AI) rApps. Further, Non RT RIC module 140 can be an Orchestration and Automation function, and in particular, an element of open RAN architecture that can control and optimize other RAN elements and resources, such as using artificial intelligence and machine learning to enhance the control and optimization of such network resources. In addition, O-Cloud module 200 can be a general cloud infrastructure network-based module. At step 2, rApp module 120 that is hosted within the Non RT RIC platform module 140 analyzes the O1 and O2 telemetry data based on use case and security level (among other factors), and can identify a cryptography suite or cryptography algorithm family. Here, elements O1 and O2 can be interfaces that connect the SMO module or framework 100 to the rApp module 120 and Non RT RIC module 140 (and any other RAN managed elements). In particular, the O2 interface is generally how the SMO module or framework 100 communicates with the O-Cloud platform module 200.

Still referring to FIG. 3, at step 3, cryptography policy ("Crypto policy") guidance information is sent to the O-Cloud platform module 200 for selection of an energy efficient cryptography algorithm by the SMO module or framework 100, for example, selection of an algorithm such as Falcon or Crystal Dilithium. Here, a Crypto policy can refer to rules-based conditions that is determined at the rApp. Further, since there is a pre-determined set of crypto algorithms in the context of PQC, the application of these rules-based conditions would result in one or more group of crypto algorithms. One method of finding this mapping to the one or more other groups of crypto algorithms can be through the table look up. However, in other embodiments, a more granular approach through a decision tree/machine learning process could also be used. At step 4, the O-Cloud platform module 200 successfully selects the Crypto policy, such as a Crypto policy associated with the Falcon crypto algorithm, wherein the selected Crypto policy is then sent to the SMO module or framework 100, and further wherein the rApp/non RT RIC modules receive confirmation of a change of the Crypto policy selected at the O-Cloud platform module 200.

Still referring to FIG. 3, at step 5, the rApp/non RT RIC modules of the SMO module or framework 100 generates a final cryptography policy guidance data for the O-Cloud platform module 200. Next, at step 6, the SMO module or framework 100 sends the final cryptography policy guidance information for the cryptography algorithm and parameters to be applied for both data at rest and in transit to the O-Cloud platform module 200. As an example, such final cryptography policy guidance information for the Falcon cryptography algorithm can include Qs for number of queries, λ for targeted security level, and n for the ring degree, among others. Here, there can be an assumption that the system has a prior baseline Crypto policy enabled before the final cryptography policy is applied in step 6. For example, in 3GPP standards, even if the encryption is disabled, it is treated as a Crypto policy with Null Cryptography. Further, the method for the optimization of the cryptography suite can be performed within the algorithm implemented within the rApp module 120 that is hosted in the non RT RIC platform module 140. The energy consumption telemetry information collected from the O-Cloud platform, the context of network utilization, and the security level of the algorithm can be utilized as inputs to generate the Crypto policy that is enforced on the interfaces (such as O1, O2, A1) and cloud platform (persistent data encryption), etc.

Still referring to step 6 of FIG. 3, and as previously disclosed, one example of final cryptography policy guidance can include the Falcon cryptography algorithm family of PQC algorithms. For further exemplary purposes, as per TABLE 2, the algorithm can satisfy the HIGH Security, HIGH Energy, and HIGH Network criticality properties. Further, the three primary parameters of this algorithm class are 1) the maximal number of signing queries Qs, 2) the targeted security level λ, and 3) the degree n of the ring Z. For Qs=2^64, n=512, and λ=128 for NIST Level I; and n=1024, and λ=256 for NIST Level V. Therefore, for exemplary purposes, the final cryptography policy and parameter for critical infrastructure network like a smart grid security in a CSV format could be represented as {(Security—High, Energy—High, Critical—High) (Qs=2^64, n=1024, λ=256)}.

Here, in one exemplary embodiment, some of exemplary cryptography algorithm suite or families can be represented in an example decision or truth table, such as shown with respect to TABLE 1. Here, TABLE 1 illustrates some partial exemplary possibilities for the context-based cryptography algorithm or suite selection based on the standardized levels (Low, Med, High) as applied to network security level, energy efficiency, and network criticality. However, it is contemplated within the scope of the present disclosure described herein that there can be a total of $3^3=27$ possibilities. As an example, if the desired security level is low, energy efficiency requirement is low, but network criticality requirement or importance is at medium, then the DualModeMS cryptography family or suite can be selected for efficient energy operations within the network.

TABLE 1

| | Security Level | Energy Efficiency | Network Criticality | Choice of Cryptography Algorithm |
|---|---|---|---|---|
| 1 | Low | Low | Low | DualModeMS |
| 2 | Low | Low | Med | DualModeMS |
| 3 | Low | Med | Low | Rainbow |
| 4 | Med | Low | Med | DualModeMS/ pqsigRM |
| 5 | Med | Med | Low | pqsigRM |
| 6 | Med | Med | Med | GeMSS |
| 7 | High | Med | Low | HIMQ3F |
| 8 | High | Low | Med | Gui |
| 9 | High | Low | High | SPHINCSPlus Family |
| 10 | High | High | High | Picnic-FS, Picnic-UR |

Here, the choice of the cryptography algorithm, suite, scheme, or family can be further based on the energy consumption of key generation operations amongst various PQC algorithms and their security levels (or family of cryptography algorithms). In addition, energy consumption during signing of the public key signatures can also be taken into account and considered with respect to various PQC algorithms (or family of cryptography algorithms) in determining the selection of the appropriate PQC algorithm.

It is further contemplated within the scope of the present disclosure described herein that there could be other suitable recommendations generated dynamically for different cryptography operations, such as other than shown in TABLE 1, since energy consumption during each operation could be different based on the software implementation and hardware platform on which the operations are carried out. In one exemplary embodiment, an alternate decision function for Public key signature is shown below with respect to TABLE 2.

TABLE 2

| | Security Level | Energy Efficiency | Network Criticality | Choice of Crypto |
|---|---|---|---|---|
| 1 | Low | Low | Low | pqsigRM |
| 2 | Low | Low | Med | SPhincsPlus Family |
| 3 | Low | Med | Low | GeMSS |
| 4 | Med | Low | Med | DualModeMS |
| 5 | Med | Med | Low | MQDSS |
| 6 | Med | Med | Med | Picnic-FS, UR |
| 7 | High | Med | Low | pqNTRU Sign Family |
| 8 | High | Low | Med | Gui |
| 9 | High | Low | High | SPHINCSPlus Family |
| 10 | High | High | High | FALCON |

In addition, contextual information related to the application, the network, and deployment can be captured by one of Application Programming Interfaces (API's) and operator inputs at system initialization. In one or more exemplary embodiments, mapping for network criticality level is shown in TABLE 3 below, and network security level is shown in TABLE 4 below.

TABLE 3

| Network Use Case | Criticality Level |
| --- | --- |
| 1 Public Safety, Critical infrastructure network | High |
| 2 Internet of Things (IoT) optimized network supporting social infrastructure | Med |
| 3 Public Network such as Free Hotspots at Airports, Railway stations, Parks | Low |

TABLE 4

| Network Use Case | Security Level |
| --- | --- |
| 1 Public Safety, Critical infrastructure network | High |
| 2 Internet of Things (IoT) optimized network supporting social infrastructure | High |
| 3 Public Network such as Free Hotspots at Airports, Railway stations, Parks | Med |
| 4 Emergency call, Government requirement to turn off encryption | Low |

FIG. 5 illustrates flow chart for one exemplary embodiment of a method for determining a cryptography configuration for the context-based cryptography selection method and system for energy efficient operations, such as the logic embedded within xApp in determining the cryptography configuration. Here, at step 502, the method can include initializing the system parameters and collecting the O-Cloud module 200's telemetry information via the 01 and 02 interfaces. Next, at step 504, the method can include receiving the external system context via an application interface (API) or operator inputs which can include network criticality level and applicable security level. Here, the external system context can refer to information that may be unrelated to the network operations or security levels itself. One example of this can be a change in an energy source for a network operation, wherein such change can result from an event, such as a power grid failure, among others. Upon such an event, there can be a change to alternative or temporary energy source, such as a change to sustainable/renewable sources of energy wherein the network system reduces power consumption. Under such a scenario of reduced network power consumption, despite the predetermined rules of selection of a Crypto policy, the lowest energy crypto algorithm is selected in order to comply with the reduced power consumption requirements for the network. Next, at step 506, the method can include determining the Optimal Energy Efficient Cryptography configuration via a table look up/supervised learning or decision tree approach. Next, at step 508, the method can include the O-Cloud module 200 selecting the final cryptography parameters from the cryptography family guidance received from the rApp module 120 and SMO module or framework 100. Next, at step 510, the method can include providing the final policy guidance by the rApp Security application or rApp module 120 to the O-Cloud layer module 200. Further, at step 512, the final cryptography policy can be applied on to the O-Cloud layer module 200. Here, the foregoing process of FIG. 5 can be achieved at a K8S Orchestration Layer, in particular for the Data Encryption at Rest on the cloud platform.

TABLE 5 provides a summary for one exemplary embodiment of configuration parameters that can be used with the context-based selection method and system of the disclosure described herein. Here, the configuration parameters, from "Encrypting Secret Data at Rest" by Kubernetes (May 30, 2022), available currently but are not compliant with the Post Quantum Encryption requirements may be considered as a "Low" Security Level.

TABLE 5

| Name | Encryption | Strength | Speed | Key Length |
| --- | --- | --- | --- | --- |
| identity | None | NA | NA | NA |
| secretbox | XSalsa20 and Poly1305 | Strong | Faster | 32-byte |
| aesgcm | AES-GCM with random nonce | Must be rotated every 200k writes | Fastest | 16, 24 or 32-byte |
| aescbc | AES-CBC with PKCS#7 padding | Weak | Fast | 32-byte |
| kms | Uses envelope encryption scheme: data is encrypted by data encryption keys (DEKs) using AES-CBC with PKCS#7 padding. DEKs are encrypted by key encryption keys (KEKs) according to configuration in Key Management Service (KMS). | Strongest | Fast | 32-byte |

However, AES with 256 length key and above is currently considered to be Quantum Safe and can be supported through the extension of Crypto Libraries in the Kubernetes Layer. This can be securely exposed throughout the extension of the kube-apiserver Encryption Configuration, namely, from "Encrypting Secret Data at Rest" by Kubernetes (May 30, 2022). Accordingly, security levels that AES can be mapped to for PQC requirements are provided in TABLE 6 below.

TABLE 6

| Low-Level I and II a per NIST definition | AES-128 |
| --- | --- |
| Med-Level III and IV as per NIST definition | AES-192 |
| High- Level V as per NIST definition | AES-256 |

Further, a ProviderConfiguration API field appears in ResourceConfiguration API field, wherein the ProviderConfiguration API field can store the provided configuration for an encryption provider, such as shown in TABLE 7, as provided by Kubernetes.

TABLE 7

| Field | Description |
| --- | --- |
| aesgcm [Required] AESConfiguration | Aesgcm is the configuration for the AES-GCM transformer |
| aescbc [Required] AESConfiguration | Aescbc is the configuration for the AES-CBC transformer |
| secretbox [Required] SecretboxConfiguration | secretbox is the configuration for the Secretbox based transformer |
| identity [Required] IdentityConfiguration | identity is the (empty) configuration for the identity transformer |
| kms [Required] KMSConfiguration | Kms contains the name, cache size and path to configuration file for KMS based envelope transformer |

Here, in the example of TABLE 7, the ProviderConfiguration API can be extended to support a PostQuantumEncryption API field. The PQCConfiguration API field description can include algorithms and keys to be used for creating the cryptography transformer such as AES 128, 192, and 256 bits keys. The PostQuantumEncryption field contains the API configuration information for an AES cryptography transformer as provided in TABLE 8.

TABLE 8

| Field | Description |
| --- | --- |
| keys [Required] []Key | keys is a list of keys to be used for creating the AES transformer.<br>AES-128: Security level Low and Energy Efficiency High<br>AES-192: Security level Med and Energy Efficiency Med<br>AES-256: Security level High and Energy Efficiency Low |

Here, the Key field can include the name and the secret data of the provided key for a cryptography transformer as provided in TABLE 9.

TABLE 9

| Field | Description |
| --- | --- |
| name [Required] string | name is name of key to be used while storing data to disk |
| secret [Required] string | secret is the actual key, encoded in base64 |

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of selecting a cryptography algorithm within a network, the method comprising:
   receiving, by a service management and orchestrator (SMO) framework in an Open-Radio Access Network (O-RAN), network data from one or more network interfaces or network elements;
   analyzing, by the SMO, the network data to identify a cryptography algorithm from a plurality of cryptography algorithms; and
   identifying, by the SMO, the cryptography algorithm from the plurality of cryptography algorithms based on energy consumption during signing of public key signatures and at least one of the following parameters: network security level, network criticality, or energy efficiency.

2. The method of claim 1, wherein the step of analyzing the network data to identify the cryptography algorithm further comprises receiving a plurality of identifiers associated with the network data, wherein the plurality of identifiers are each further associated with a degree of importance in connection with the network security level parameter.

3. The method of claim 1, wherein the step of analyzing the network data to identify the cryptography algorithm further comprises receiving a plurality of identifiers associated with the network data, wherein the plurality of identifiers are each further associated with a degree of importance in connection with the network criticality parameter.

4. The method of claim 1, wherein the step of analyzing the network data to identify the cryptography algorithm further comprises receiving a plurality of identifiers associated with the network data, wherein the plurality of identifiers are each further associated with a degree of importance in connection with the energy efficiency parameter.

5. The method of claim 1, wherein the SMO framework comprises an orchestrator module in communication with a network infrastructure module.

6. The method of claim 5, wherein the step of analyzing the network data to identify a cryptography algorithm from a plurality of cryptography algorithms is performed via the orchestrator module.

7. The method of claim 6, further comprising:
   transmitting the identified cryptography algorithm from the orchestrator module to the network infrastructure module.

8. The method of claim 7, further comprising:
   receiving, via the orchestrator module, a selection of conditions with respect to the identified cryptography algorithm from the network infrastructure module.

9. The method of claim 8, further comprising:
   generating, via the orchestrator module, a cryptography policy for the network with respect to the identified cryptography algorithm.

10. The method of claim 9, further comprising:
    transmitting, via the orchestrator module, the cryptography policy for the network with respect to the identified cryptography algorithm to the network infrastructure module.

11. An apparatus for selecting a cryptography algorithm within a network, comprising:
    a memory storage storing computer-executable instructions; and
    a processor communicatively coupled to the memory storage, wherein the processor is configured to execute the computer-executable instructions and cause the apparatus to:
    receive, by a service management and orchestrator (SMO) framework in an Open-Radio Access Network (O-RAN), network data from a one or more network interfaces or network elements;
    analyze, by the SMO, the network data to identify a cryptography algorithm from a plurality of cryptography algorithms; and
    identify, by the SMO, the cryptography algorithm from the plurality of cryptography algorithms based on energy consumption during signing of public key signatures and at least one of the following parameters: network security level, network criticality, or energy efficiency.

12. The apparatus of claim 11, wherein the computer-executable instructions, when executed by the processor, further cause the apparatus to:
    receive a plurality of identifiers associated with the network data, wherein the plurality of identifiers are each further associated with a degree of importance in connection with the network security level parameter.

13. The apparatus of claim 11, wherein the computer-executable instructions, when executed by the processor, further cause the apparatus to:
    receive a plurality of identifiers associated with the network data, wherein the plurality of identifiers are each further associated with a degree of importance in connection with the network criticality parameter.

14. The apparatus of claim 11, wherein the computer-executable instructions, when executed by the processor, further cause the apparatus to:
receive a plurality of identifiers associated with the network data, wherein the plurality of identifiers are each further associated with a degree of importance in connection with the energy efficiency parameter.

15. The apparatus of claim 11, wherein the SMO framework comprises an orchestrator module in communication with a network infrastructure module.

16. The apparatus of claim 15, wherein the step of analyzing the network data to identify a cryptography algorithm from a plurality of cryptography algorithms is performed via the orchestrator module.

17. The apparatus of claim 16, wherein the computer-executable instructions, when executed by the processor, further cause the apparatus to:
transmit the identified cryptography algorithm from the orchestrator module to the network infrastructure module.

18. The apparatus of claim 17, wherein the computer-executable instructions, when executed by the processor, further cause the apparatus to:
receive, via the orchestrator module, a selection of conditions with respect to the identified cryptography algorithm from the network infrastructure module.

19. The apparatus of claim 18, wherein the computer-executable instructions, when executed by the processor, further cause the apparatus to:
generate, via the orchestrator module, a cryptography policy for the network with respect to the identified cryptography algorithm.

20. A non-transitory computer-readable medium comprising computer-executable instructions for selecting a cryptography algorithm within a network by an apparatus, wherein the computer-executable instructions, when executed by at least one processor of the apparatus, cause the apparatus to:
receive, by a service management and orchestrator (SMO) framework in an Open-Radio Access Network (O-RAN), network data from a one or more network interfaces or network elements;
analyze, by the SMO, the network data to identify a cryptography algorithm from a plurality of cryptography algorithms; and
identify, by the SMO, the cryptography algorithm from the plurality of cryptography algorithms based on energy consumption during signing of public key signatures and at least one of the following parameters: network security level, network criticality, or energy.

* * * * *